(12) United States Patent
Tomar

(10) Patent No.: US 12,284,285 B2
(45) Date of Patent: *Apr. 22, 2025

(54) EFFICIENT TOKEN PROVISIONING SYSTEM AND METHOD

(71) Applicant: Visa International Service Association, San Francisco, CA (US)

(72) Inventor: Deepak Tomar, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,055

(22) Filed: Apr. 24, 2024

(65) Prior Publication Data

US 2024/0297790 A1 Sep. 5, 2024

Related U.S. Application Data

(63) Continuation of application No. 17/569,841, filed on Jan. 6, 2022, now Pat. No. 12,003,640.

(51) Int. Cl.
*H04L 9/32* (2006.01)
*G06Q 20/38* (2012.01)

(52) U.S. Cl.
CPC ..... *H04L 9/3213* (2013.01); *G06Q 20/38215* (2013.01); *H04L 9/3236* (2013.01); *G06Q 2220/00* (2013.01)

(58) Field of Classification Search
CPC . H04L 9/3213; H04L 9/3236; H04L 63/0807; H04L 9/0861; H04L 9/0863; H04L 63/083; G06Q 20/38215; G06Q 2220/00
See application file for complete search history.

(56) References Cited

U.S. PATENT DOCUMENTS

| | | | |
|---|---|---|---|
| 9,978,062 B2 | 5/2018 | Raj et al. | |
| 10,025,941 B1 | 7/2018 | Griffin et al. | |
| 10,255,456 B2* | 4/2019 | Guglani | G06F 21/335 |
| 10,568,016 B2* | 2/2020 | Youdale | H04W 4/50 |

(Continued)

FOREIGN PATENT DOCUMENTS

| | | |
|---|---|---|
| WO | 2016134016 A1 | 8/2016 |
| WO | 2021119495 A1 | 6/2021 |

OTHER PUBLICATIONS

U.S. Appl. No. 17/569,841, "Notice of Allowance", Jan. 29, 2024, 14 pages.

(Continued)

*Primary Examiner* — John B King
(74) *Attorney, Agent, or Firm* — Kilpatrick Townsend & Stockton LLP

(57) ABSTRACT

A method is disclosed. The method includes receiving, by a token service computer, a detokenization request message comprising a first token from a network processing computer, and then determining a first credential that is stored in association with the first token in a database. The method includes determining a user identifier that is stored in association with the first credential in the database, determining that a second credential is stored in association with the user identifier, generating a detokenization response message comprising the second credential, and providing the detokenization response message to the network processing computer.

20 Claims, 8 Drawing Sheets

(56) References Cited

U.S. PATENT DOCUMENTS

| | | | |
|---|---|---|---|
| 10,846,677 | B2 | 11/2020 | Mcmahon et al. |
| 10,904,002 | B2 | 1/2021 | Palanisamy |
| 11,093,936 | B2 * | 8/2021 | Dill .................. G06Q 20/40 |
| 2013/0332344 | A1 | 12/2013 | Weber |
| 2015/0127547 | A1 | 5/2015 | Powell et al. |
| 2016/0028550 | A1 | 1/2016 | Gaddam et al. |
| 2016/0148197 | A1 | 5/2016 | Dimmick |
| 2017/0103387 | A1 | 4/2017 | Weber |
| 2017/0163617 | A1 | 6/2017 | Laxminarayanan et al. |
| 2017/0338965 | A1 | 11/2017 | Gaddam et al. |
| 2019/0020478 | A1 | 1/2019 | Girish et al. |
| 2019/0356489 | A1 | 11/2019 | Palanisamy |
| 2021/0295332 | A1 * | 9/2021 | Al-Bedaiwi ............ H04L 67/53 |
| 2021/0344672 | A1 | 11/2021 | Drechsler et al. |
| 2022/0376914 | A1 | 11/2022 | Leyva et al. |
| 2023/0072087 | A1 | 3/2023 | Dill et al. |
| 2023/0120485 | A1 | 4/2023 | Shankar et al. |
| 2023/0318832 | A1 | 10/2023 | Patterson et al. |
| 2024/0386423 | A1 * | 11/2024 | Maitra ................ G06Q 20/389 |

OTHER PUBLICATIONS

EP23150410.1 , "Extended European Search Report", Mar. 23, 2023, 8 pages.

* cited by examiner

EFFICIENT TOKEN PROVISIONING SYSTEM AND METHOD

CROSS-REFERENCE TO RELATED APPLICATIONS

This application is a continuation application of U.S. patent application Ser. No. 17/569,841, filed on Jan. 6, 2022.

BACKGROUND

Currently, when a user device performs an interaction, the user device can interact utilizing a token that acts as the user's credentials. The user device can provide the token to a resource provider to proceed with an interaction.

However, the user device must first generate request messages requesting the token. The user device needs to obtain the token prior to the interaction in a manual request. For example, the user of the user device may need to input their credentials directly into the user device. The user device then generates a token request using the credentials and sends the token request to a computer capable of providing tokens. The user device then needs to wait until tokens are provisioned before initiating any interactions.

These steps can be time consuming for end users and can also require additional communications and the use of excess computing resources.

Embodiments of the disclosure address this problem and other problems individually and collectively.

SUMMARY

One embodiment is related to a method comprising: receiving, by a token service computer, a detokenization request message comprising a first token from a network processing computer; determining, by the token service computer, a first credential that is stored in association with the first token in a database; determining, by the token service computer, a user identifier that is stored in association with the first credential in the database; determining, by the token service computer that a second credential is stored in association with the user identifier; generating, by the token service computer, a detokenization response message comprising the second credential; and providing, by the token service computer, the detokenization response message to the network processing computer.

Another embodiment is related to a server computer programmed to perform the above-described method.

Further details regarding embodiments of the disclosure can be found in the Detailed Description and the Figures.

DETAILED DESCRIPTION

Figure 1:
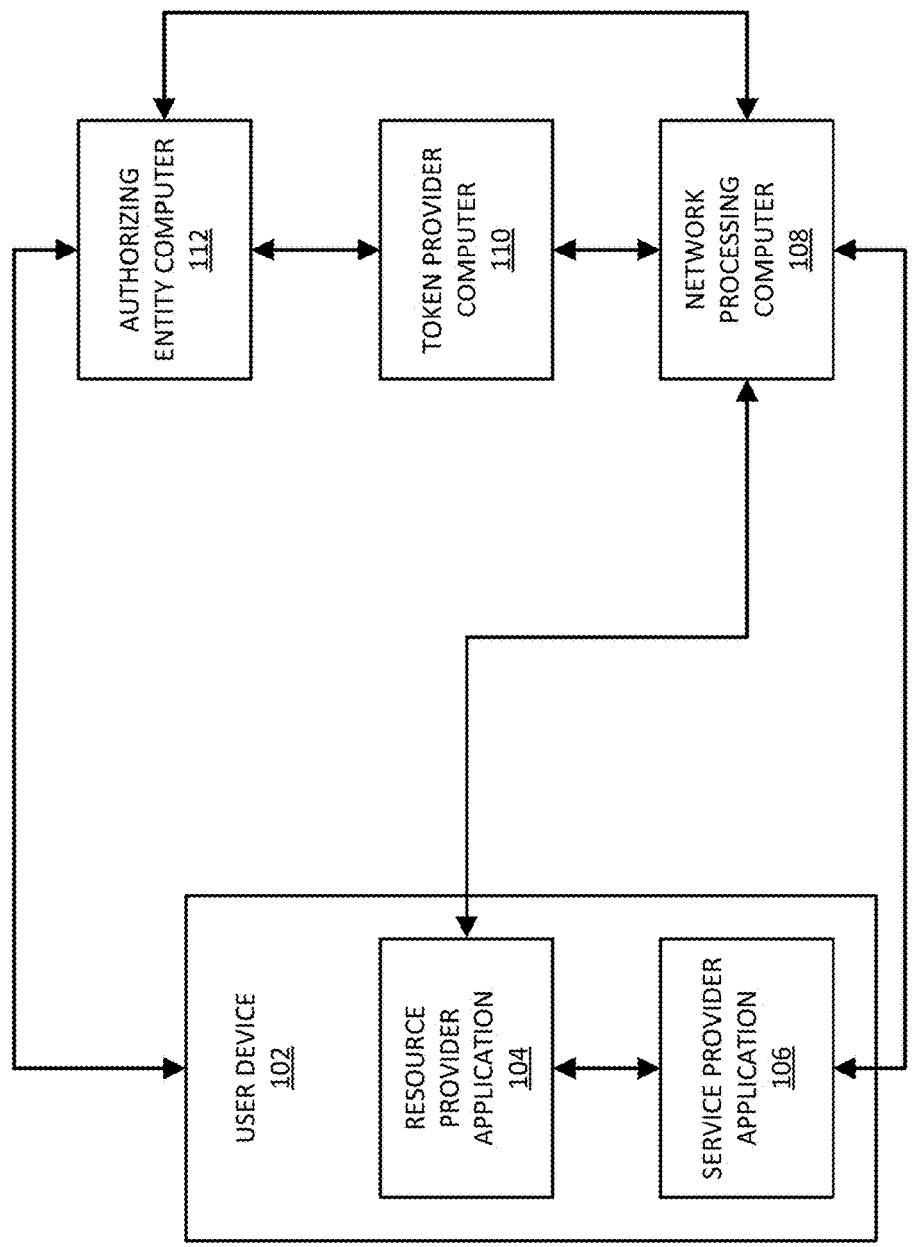
FIG. 1 shows a block diagram of an interaction processing system according to embodiments.

Prior to discussing embodiments of the disclosure, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "user identifier" can include any piece of data that can identify a user. A user identifier can comprise any suitable alphanumeric string of characters. In some embodiments, the user identifier may be derived from user identifying information. In some embodiments, a user identifier can include an account identifier associated with the user. For example, a user can be associated with an account, which has an account identifier, maintained by an authorizing entity computer.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment. An interaction can include a transaction interaction, a data transfer interaction, an access interaction, etc.

"Interaction data" can include data related to and/or recorded during an interaction. Interaction data can include an amount, a date, a time, a resource identifier, a resource provider identifier, a user identifier, credentials, and/or additional data relating to an interaction between a user and a resource provider.

A "resource provider" may be an entity that can provide a resource such as goods, services, information, and/or access. Examples of resource providers includes merchants, data providers, transit agencies, governmental entities, venue and dwelling operators, etc. A "merchant" may typically be an entity that engages in transactions and can sell goods or services, or provide access to goods or services.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), username, expiration date, and verification values such as CVV, dCVV, CVV2, dCVV2, and CVC3 values.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization enhances transaction efficiency and security.

A "cryptogram" may include a piece of obscured text such as encrypted text. A cryptogram may be formed by encrypting input data with an encryption key such as a symmetric encryption key. In some embodiments, a cryptogram is reversible so that the inputs that are used to form the cryptogram can be obtained using the same symmetric key to perform a decryption process. In some embodiments, if input data is encrypted using a private key of a public/private key pair, the cryptogram may also be a digital signature. A digital signature may be verified with a public key of the public/private key pair. In some embodiments, a cryptogram may include a dCVV (dynamic card verification value).

In embodiments of the invention, a cryptogram can be generated in any suitable manner. In some embodiments, the input to the cryptogram can include data elements including an account identifier such as primary account number, and a variable data element such as a counter, a time of day, or interaction value. Such data may be included using an encryption process such as DES, triple DES, or AES using any suitable encryption keys. The encryption keys may also be UDKs or unique derived keys, and may be generated based upon device specific information such as an account number, which may be encrypted using a master derivation key (MDK). The cryptogram can be verified by another computer such a remote computer by either decrypting the cryptogram to and verifying the decrypted contents with other data (e.g., an account number stored on file), or by encrypting other inputs and then comparing the encrypted result to the cryptogram.

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

A "digital wallet" can include a software-based system that allows an individual to conduct electronic interactions. A digital wallet may store user profile information, credentials, account information, one or more digital wallet identifiers, one or more tokens specific to the individual and/or electronic device, one or more token authentication cryptograms (TACs) specific to the individual and/or the electronic device, and/or the like and can be used in a variety of interactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may allow the user to load one or more payment cards onto the digital wallet so as to make a payment without having to enter an account number or present a physical card.

A "service provider application" may include an application maintained and operated by an entity that provides a service (e.g., a digital wallet) to a user. In some embodiments, a service provider application may also be referred to as a "digital wallet provider." A service provider application may provide standalone user-facing software applications that store account numbers, or representations of the account numbers (e.g., token(s)), on behalf of a user to facilitate interactions at more than one unrelated entity (e.g., resource providers), perform person-to-person interactions, or load amounts into the digital wallet. Additionally, a service provider application may also provide one or more of the following functions: generating a token authentication cryptogram (TAC), storing multiple tokens behalf of a user, storing other information including a physical address, an email address, and an interaction history, initiating an interaction by one or more methods, such as providing a user name and password, near field communication (NFC) or a physical token, and may facilitate pass-through or two-step interactions.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Embodiments of the invention allow for the provisioning of tokens for credentials during an interaction between a user and a resource provider. In embodiments of the invention, a linked credential can be provisioned to a mobile device during an interaction that is initiated with a token, which is a substitute for some other credential. The linked credential can be linked to the other credential. For example, the linked credential and the other credential may be two account numbers that are associated with a user, and that are managed by an authorizing entity such as an issuer bank. The linked credential can then be used to obtain a second token that corresponds to the linked credential.

In specific embodiments, before an interaction, a user can enroll (e.g., sign-up) with an authorizing entity computer operated by an authorizing entity (e.g., an issuer, a government authority, a secure access management service, etc.), which may store credentials (e.g., account numbers) associated with a user. At some point in time, the authorizing entity computer can also provide a user profile of the user (e.g., including the one or more credentials and other information of the user) to a token service computer.

Later, the user can initiate an interaction with a resource provider application on the user device. For example, the user may wish to access a location or conduct a purchase transaction using the resource provider application. The resource provider application can query a service provider application (e.g., a digital wallet installed on the user device) on the user device for a token, which can be used to conduct the interaction. The service provider application can first authenticate the user. After authenticating the user, the service provider application can then contact a network processing computer to request a cryptogram for the interaction. The cryptogram can later be submitted along with the token in an authorization request message. The cryptogram can be used to restrict the use of the token to a particular interaction context (e.g., it may limit the user of the token according to time, type of interaction, type of resource provider, etc.). In the cryptogram request, the service provider application can provide the token (e.g., previously provisioned to the service provider application), a service provider application identifier, and any other suitable information, to the network processing computer.

Upon receiving the cryptogram request, the network processing computer can communicate with the token service computer to detokenize the received token, determine a first credential associated with the token, determine an account identifier associated with the token, and then determine whether or not there is another credential (e.g., a second credential) associated with the user that has not yet been tokenized and/or has not yet been provided to the service provider application. For example, the network processing computer may determine that a second credential has not yet been tokenized or a second token associated with the second credential has not yet been provided to the service provider application. Once the network processing computer has determined that the second credential and/or the second token has not been provided to the service provider application, the network processing computer can then provide the cryptogram and the second credential to the service provider application.

The service provider application can provide the cryptogram to the resource provider application, and the resource provider application can use the token and the cryptogram to conduct the current interaction.

In addition, the service provider application can prompt the user to obtain a second token to the service provider application for the second credential. If the user decides to add the second token, then the service provider application can request the second token from the network processing computer using the recently received second credential. The second token can then be stored by the resource provider application and can be used by the user in a subsequent interaction.

FIG. 1 shows a system 100 according to embodiments of the disclosure. The system 100 comprises a user device 102 (which comprises a resource provider application 104 and a service provider application 106), a network processing computer 108, a token service computer 110, and an authorizing entity. The user device 102 can be in operative communication with the network processing computer 108 and the authorizing entity computer 112. The network processing computer 108, the token service computer 110, and the authorizing entity computer 112 can also be in operative communication with each other. The resource provider application 104 may also have a resource provider application server computer (not shown) associated with it. The resource provider application server computer may allow the resource provider application 104 and the network processing computer 108 to communicate with each other. The service provider application 106 may also have a service provider application server computer (not shown) associated with it. The service provider application server computer may allow the service provider application 106 and the network processing computer 108 to communicate with each other.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between at least the devices of the system 100 in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The user device 102 can be a device such as a mobile phone or laptop computer. The user device 102 can include a resource provider application 104 and a service provider application 106. Further details regarding exemplary user devices are provided below.

The resource provider application 104 can be an application that is operated or provided by a resource provider. The resource provider application 104 can allow a user to obtain a resource for an interaction. For example, in some embodiments, the resource provider application 104 can allow a user to purchase resources, which can be provided to the user of the user device 102 after completion of an interaction (e.g., a transaction). In other embodiments, the resource provider application 104 can control entrance and exit into and from a building or terminal. In yet other embodiments, the resource provider application 104 can be an application, which is created and maintained by a government agency that may be used to confirm a user's identity during an interaction (e.g., for the purpose of authorizing access to social security benefits).

The service provider application 106 can include an application configured to provide a service. In some embodiments, the service provider application 106 can provide digital wallet functionality to the user device 102. In some embodiments, the service provider application 106 can store one or more tokens corresponding to one or more credentials. The user of the user device 102 can utilize the one or more tokens to conduct an interaction. During an interaction, the service provider application 106 can communicate with the network processing computer 108 to obtain cryptograms for the interaction. Further, during an interaction that uses a first token, the service provider application 106 can request to obtain a second credential from the network processing computer 108. The second credential is different than a first credential that corresponds to the first token that was utilized in the interaction.

The network processing computer 108 can include a computer that facilitates in the processing of interactions. The network processing computer 108 may include data processing subsystems, networks, and operations used to support and deliver authorization services, exception file services, and clearing and settlement services. For example, the network processing computer 108 may comprise a server coupled to a network interface (e.g., by an external communication interface), and databases of information. The network processing computer 108 may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The network processing computer 108 may use any suitable wired or wireless network, including the Internet.

The network processing computer 108 can communicate with a token service computer 110 to tokenize credentials and detokenize tokens. The network processing computer 108 can generate cryptograms for interactions.

The token service computer 110 can include one or more computers that generate, process, and maintain tokens. For example, the token service computer 110 may include or be in communication with a token database where the generated tokens are stored. Additionally or alternatively, the token database may maintain one-to-one mapping between a token and a credential represented by the token. In some embodiments, various entities of a tokenization ecosystem may assume the roles of the token service computer 110. For example, the network processing computer 108 can include the token service computer 110 by implementing the token services.

The token service computer 110 can store tokens in association with their corresponding credentials. Further-more, the credentials can be installed in association with an account identifier for the user for which the account for the credentials is maintained.

The authorizing entity computer 112 can include a computer that can authorize interactions. The authorizing entity computer 112 can issue and manage one or more accounts associated with the user of the user device 102. Managing an account can include authorizing interactions on the account. The authorizing entity computer 112 can also store credentials (e.g., account numbers) associated with various users.

Figure 2:
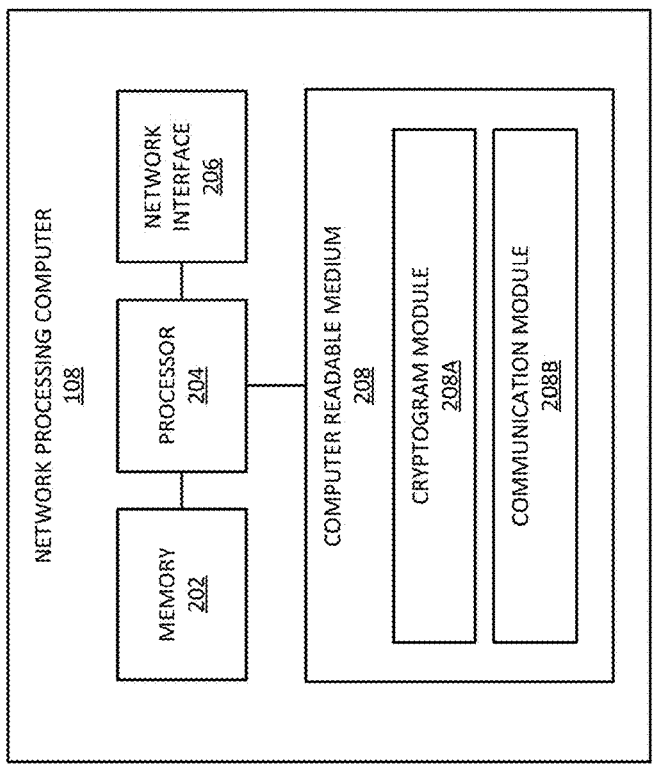
FIG. 2 shows a block diagram of components of a network processing computer according to embodiments.

FIG. 2 shows a block diagram of a network processing computer 108 according to embodiments. The exemplary network processing computer 108 may comprise a processor 204. The processor 204 may be coupled to a memory 202, a network interface 206 and a computer readable medium 208. The computer readable medium 208 can comprise a cryptogram module 208A, and a communication module 208B.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store interaction data, tokens, credentials, etc.

The computer readable medium 208 may comprise code, executable by the processor 204, for performing a method comprising: receiving a cryptogram request message comprising a token associated with a first credential during an interaction between a user of a user device and a resource provider of a resource provider application on the user device; generating a detokenization request message comprising the token; providing the detokenization request message to a token service computer; receiving a detokenization response message comprising a second credential from the token service computer; obtaining a cryptogram for the interaction; generating a cryptogram response message comprising the second credential and the cryptogram; and providing the cryptogram response message in response to the cryptogram request message.

The cryptogram module 208A may comprise code or software, executable by the processor 204, for creating and verifying cryptograms. The cryptogram module 208A, in conjunction with the processor 204, can generate one or more cryptograms prior to, during, and after an interaction. The cryptogram module 208A, in conjunction with the processor 204, can generate a cryptogram in any suitable manner. For example, the cryptogram module 208A, the input to a cryptogram can include data elements including an account identifier such as primary account number, and a variable data element such as a counter, a time of day, a date, and/or an interaction value. The cryptogram module 208A, in conjunction with the processor 204, can encrypt data elements using an encryption process such as DES, triple DES, or AES using any suitable encryption keys. The encryption keys may also be UDKs or unique derived keys, and may be generated based upon device specific information such as an account number, which may be encrypted using a master derivation key (MDK).

The cryptogram module 208A, in conjunction with the processor 204 can receive a cryptogram and compare the received cryptogram to a stored cryptogram in order to verify the received cryptogram. In some embodiments, the cryptogram module 208A, in conjunction with the processor 204, can receive a cryptogram and then generate a new cryptogram using predetermined cryptogram generation elements (e.g., a date, a particular cryptographic key, etc.). The cryptogram module 208A, in conjunction with the processor 204, can compare the received cryptogram with the newly generated cryptogram. If the received cryptogram matches the newly generated cryptogram, then the received cryptogram is valid, since it was generated using the same data in the same manner as the newly generated cryptogram.

The communication module 208B may comprise code or software, executable by the processor 204, for communicating with other devices. The communication module 208B may be configured or programmed to perform some or all of the functionality associated with receiving, sending, and generating electronic messages for transmission through the network processing computer 108 to or from any of the devices shown in FIG. 1. When an electronic message is received by the network processing computer 108 via the network interface 206, it may be passed to the communication module 208B. The communication module 208B, in conjunction with the processor 204, may identify and parse the relevant data based on a particular messaging protocol used. As examples, the received information may comprise identification information, authorization information, request information, response information, and/or any other information that network processing computer 108 may utilize. The communication module 208B, in conjunction with the processor 204, may transmit any received information to an appropriate module within the network processing computer 108. The communication module 208B, in conjunction with the processor 204, may receive information from one or more of the modules in the network processing computer 108 and generate an electronic message in an appropriate data format in conformance with a transmission protocol so that the message may be sent to one or more entities within system 100 (e.g., to the token service computer, the service provider application 106, the resource provider application 104, the authorizing entity computer 112, etc.). The electronic message may then be passed to the network interface 206 for transmission.

The network interface 206 may include an interface that can allow the network processing computer 108 to communicate with external computers. The network interface 206 may enable the network processing computer 108 to communicate data to and from another device (e.g., service provider applications, token service providers, resource provider applications, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 3:
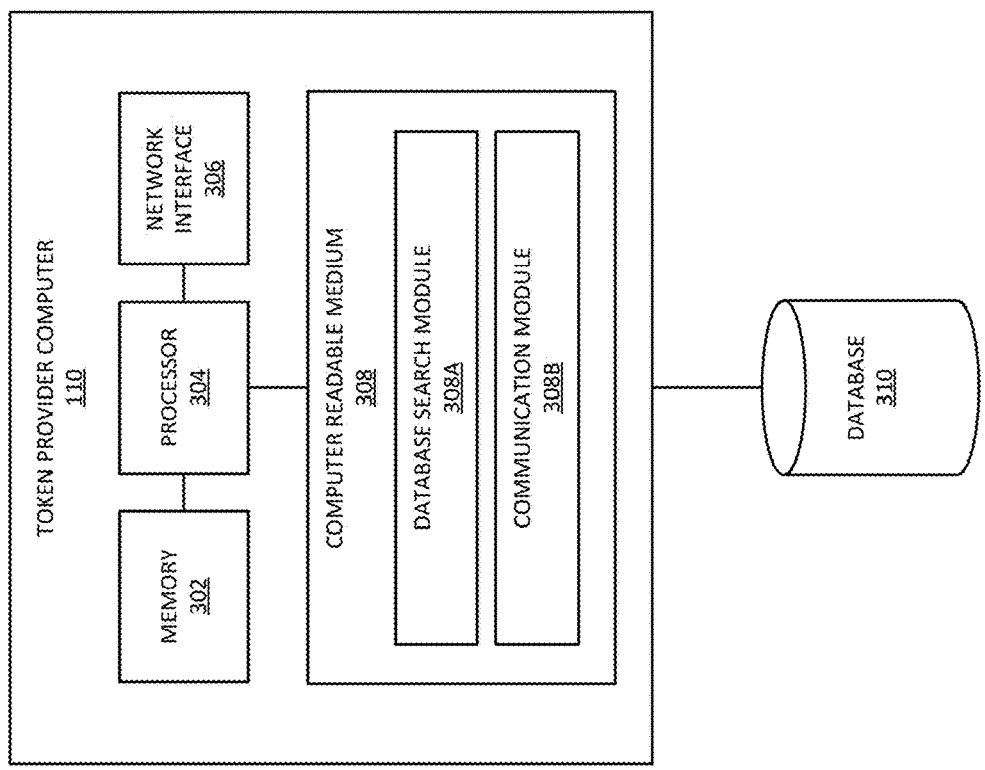
FIG. 3 shows a block diagram of components of a token service computer according to embodiments.

FIG. 3 shows a block diagram of a token service computer 300 according to embodiments. The exemplary token service computer 300 may comprise a processor 304. The processor 304 may be coupled to a memory 302, a network interface 306 and a computer readable medium 308. The computer readable medium 308 can comprise a database search module 308A and a communication module 308B. The token service computer 300 can be in operative communication with a database 310.

The memory 302 can be used to store data and code. The memory 302 may be coupled to the processor 304 internally or externally (e.g., cloud based data storage), and may comprise any combination of volatile and/or non-volatile memory, such as RAM, DRAM, ROM, flash, or any other suitable memory device. For example, the memory 302 can store credentials, tokens, user identifiers, service provider identifiers, etc.

The computer readable medium 308 may comprise code, executable by the processor 304, for performing a method comprising: receiving a detokenization request message comprising a first token from a network processing computer; determining a first credential that is stored in association with the first token in a database; determining a user identifier that is stored in association with the first credential in the database; determining that a second credential is stored in association with the user identifier; generating, by the token service computer, a detokenization response message comprising the second credential; and providing, by the token service computer, the detokenization response message to the network processing computer.

The database search module 308A may comprise code or software, executable by the processor 304, for searching a database and obtaining data from the database. The database search module 308A, in conjunction with the processor 304, can search a database, such as the database 310, for tokens, credentials, and user identifiers.

For example, the database search module 308A, in conjunction with the processor 304, can obtain a first token from a network processing computer. The database search module 308A, in conjunction with the processor 304, can determine whether or not the first token is included in the database 310. If the first token is included in the database 310, then the database search module 308A, in conjunction with the processor 304, can obtain any data that is stored in association with the first token (e.g., any data which a pointer of the first token references). The first token, for example, can be stored in association with a first credential. The database search module 308A, in conjunction with the processor 304, can obtain the first credential from the database 310.

After obtaining the first credential, the database search module 308A, in conjunction with the processor 304, can obtain any data that is stored in association with the first credential (e.g., any data which a pointer of the first credential references). For example, the first credential can be stored in association with a user identifier (e.g., a hashed account identifier) as well as the first token. The database search module 308A, in conjunction with the processor 304, can obtain the user identifier from the database 310.

After obtaining the user identifier, the database search module 308A, in conjunction with the processor 304, can obtain any number of credentials that are stored in association with the user identifier. For example, there may be three credentials that are associated with the user identifier. The database search module 308A, in conjunction with the processor 304 can retrieve any of the credentials associated with the user identifier from the database 310.

The communication module 308B can be similar to the communication module 208B and will not be repeated here. The network interface 306 can be similar to the network interface 206 and will not be repeated here.

The database 310 can include any suitable database. The database 310 may be a conventional, fault tolerant, relational, scalable, secure database such as those commercially available from Oracle™ or Sybase™. The database 310 can store credentials, tokens, and user identifiers. The database 310 can be a token vault.

Figure 4:
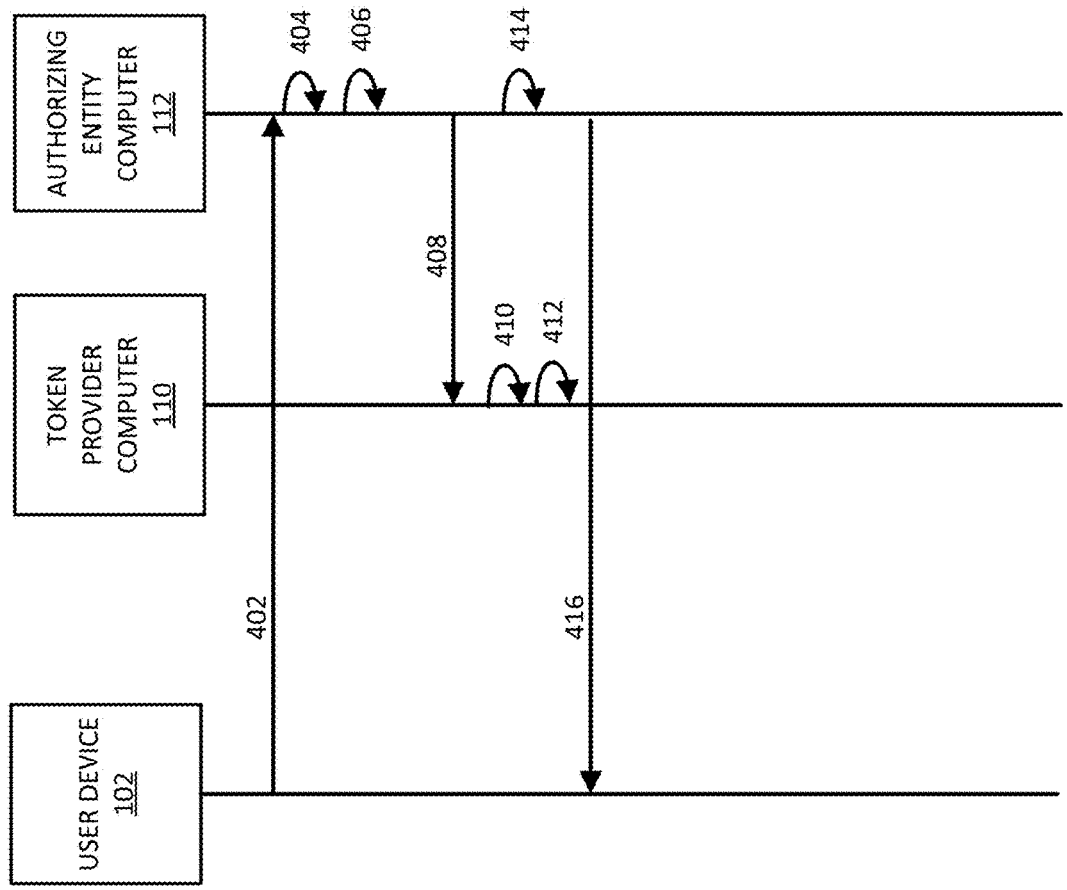
FIG. 4 shows a flowchart of an enrollment method according to embodiments.

FIG. 4 shows a flowchart of an enrollment method according to embodiments. The method illustrated in FIG. 4 will be described in the context of a user of a user device 102 enrolling in a token provisioning process that allows for provisioning of a second token to a user device during an interaction initiated by the user device using a first token.

At step 402, the user device 102 can provide an enrollment request message comprising user profile data to the authorizing entity computer 112. The user profile data can include data relating to the user and/or the user device 102. For example, the user profile data can include a phone number, an email address, a physical address, a date of birth, a user device identifier, etc. In some embodiments, the user profile data can include login information (e.g., a username, a password, etc.), if the user has an account with the authorizing entity computer 112.

At step 404, after receiving the user profile data from the user device 102, the authorizing entity computer 112 can determine whether or not the user device 102 and/or the user is already enrolled in the token provisioning process. For example, the authorizing entity computer 112 may already maintain an account for the user of the user device 102. The authorizing entity computer 112 can identify the account using any suitable portion of the user profile data (e.g., the user device identifier, the username and password, etc.).

At step 406, if the user has not already been enrolled in the token provisioning process, the authorizing entity computer 112 can obtain the credential for the account (e.g., a primary account number (PAN)) and a user identifier. In some embodiments, the user identifier can be a hashed value such as a hashed credential or a hashed account identifier. Hashing the account identifier provides uniqueness to the user identifier and also protects the account identifier. The user identifier can be used to identify the user with respect to the authorizing entity computer 112 and the authorizing entity that operates the authorizing entity computer. A number of credentials (e.g., primary account numbers) can be associated with the user identifier.

At step 408, the authorizing entity computer 112 can provide the credential and the user identifier (e.g., a hashed account identifier) to the token service computer 110. The authorizing entity computer 112 can provide the credential and the user identifier to the token service computer 110 for storage, and can link it to a token. If the token already exists for the credential, then the authorizing entity computer 112 can provide the credential to the token service computer 110. In other cases, the token service computer 110 can generate a token for the credential if the token does not already exist.

At step 410, after receiving the credential and the user identifier, the token service computer 110 can obtain a token for the credential. For example, the token service computer 110 can retrieve a token from a pool of available tokens in a token database. In other embodiments, the token service computer 110 can generate the token. The generated token may be based on the credential. For example, the token service computer 110 can generate the token, which may appear to be a random value, using the credential and/or other data associated with the user, the user device 102, and/or the user account. In other embodiments, the token service computer 110 can generate a random or pseudorandom value for the token.

At step 412, after generating the token, the token service computer 110 can store the credential, the user identifier (which can be a hashed value), and the token in association with each other. For example, the token service computer 110 can store the credential, the user identifier, and the token in a database.

Table 1, below, illustrates an example data structure for storing the token, the credential, and user identifiers in the database. For example, the token 1234567890123456 can be stored in association with the credential 3456789012345678. Further, the credential 3456789012345678 can be stored in association with the user identifier 01. The user identifier can identifier a particular user. The user, in this example, has two credentials. The user identifier can reference both of the credentials of 1234567890123456 and 5678678978908901. The second credential of 5678678978908901 can be stored in association with the second token of 9999999998888888.

TABLE 1

Example token-credential-identifier data structure

| Token | Credential | User Identifier |
|---|---|---|
| 1234567890123456 | 3456789012345678 | 01 |
| 9999999998888888 | 5678678978908901 | 01 |

At step 414, after providing the credential and the user identifier to the token service computer 110, the authorizing entity computer 112 can generate an enrollment response message. Step 414 occurs after step 406 and may be performed before, after, or during, steps 408, 410, and 412. The enrollment response message can comprise an indication of user and/or user device 102 enrollment or an indication that enrollment failed.

At step 416, after generating the enrollment response message, the authorizing entity computer 112 can provide the enrollment response message to the user device 102.

Figure 5A:
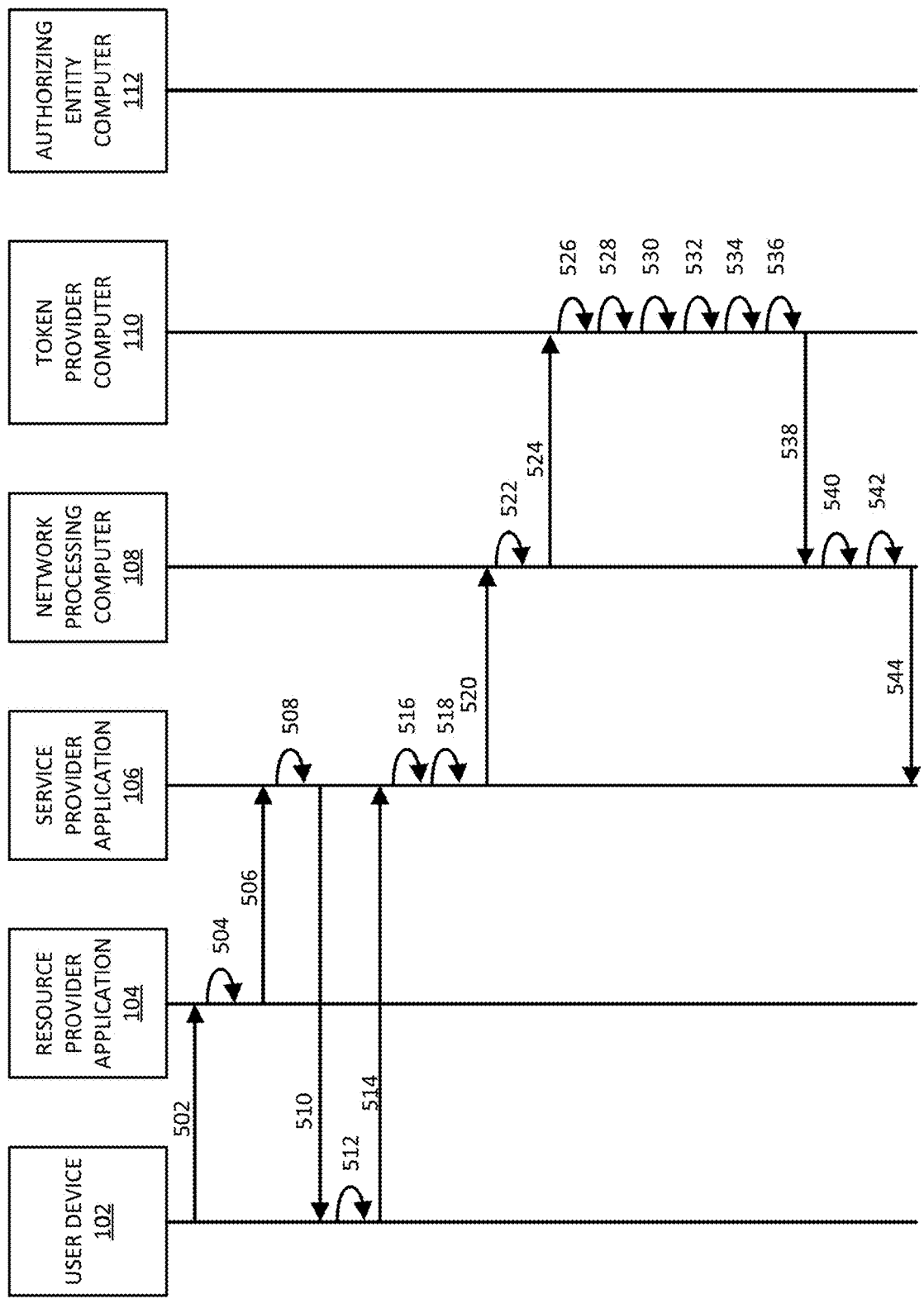
FIGS. 5A-5C show a flowchart of an inner-interaction token provisioning method according to embodiments.
Figure 5B:
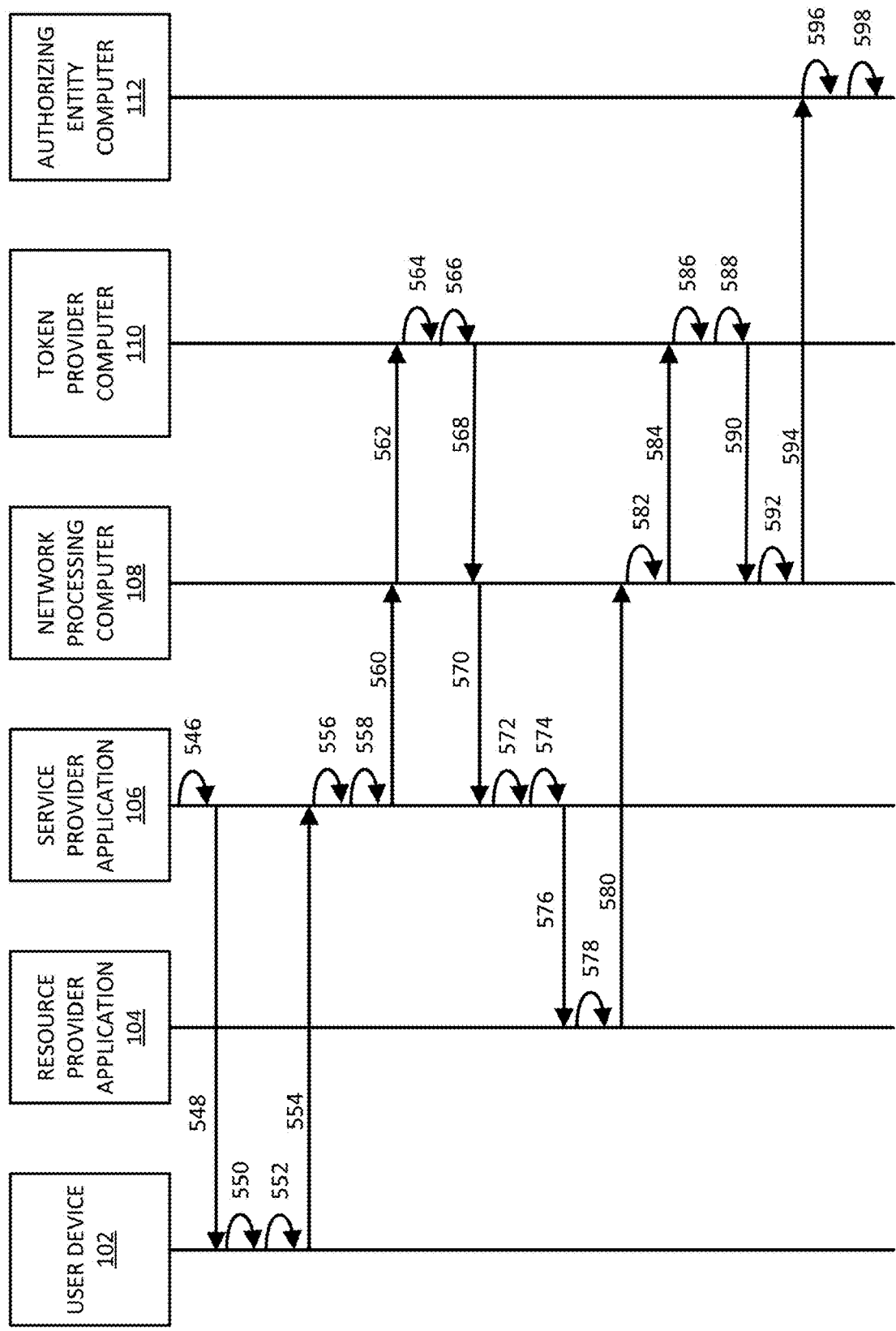
Figure 5C:
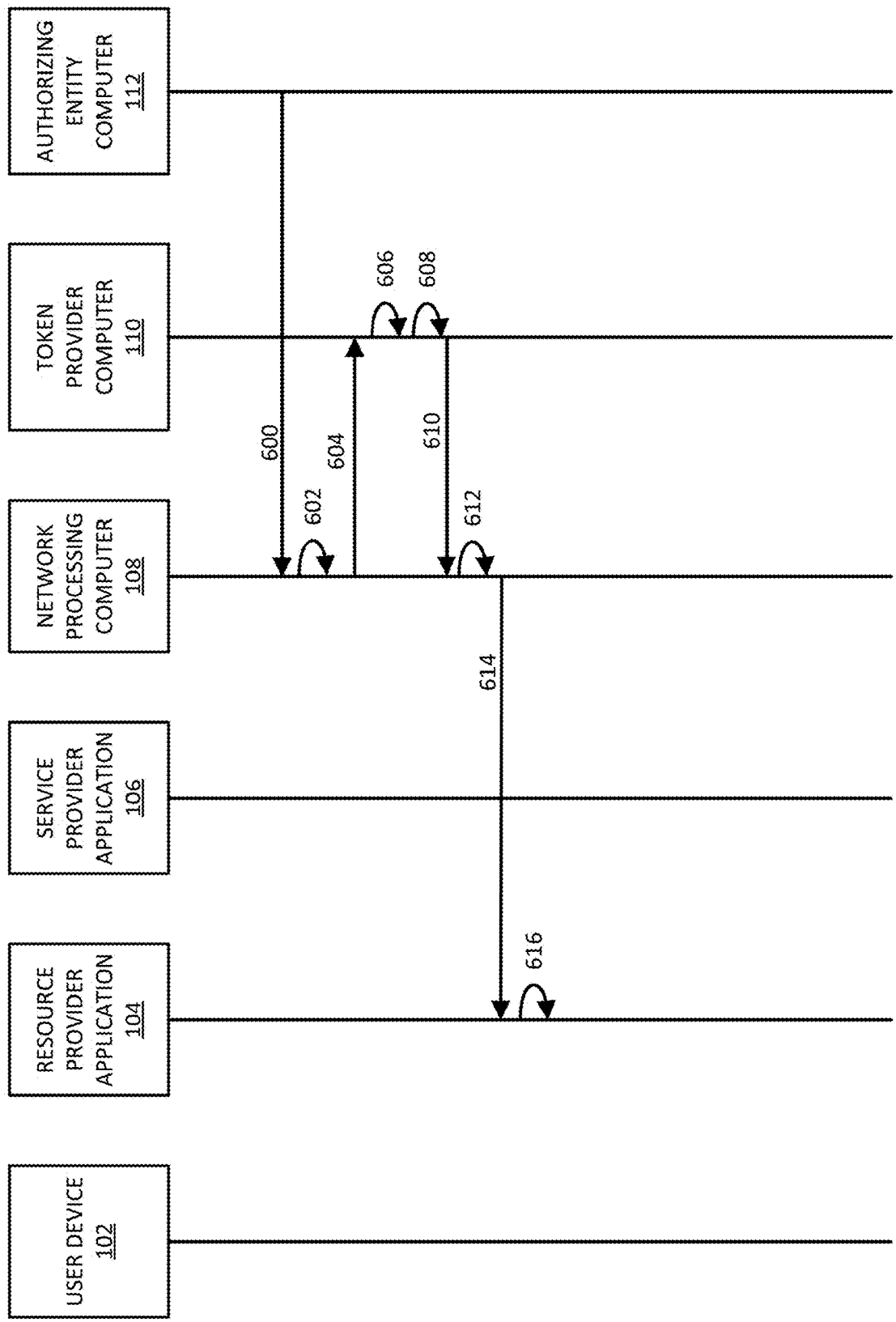

FIGS. 5A-5C show a flowchart of methods according to embodiments. The methods illustrated in FIGS. 5A-5C can be described in the context of provisioning a second token to a user device during an interaction initiated by the user device using a first token. In the illustrations in FIGS. 5A-5C, the resource provider application 104 and the service provider application 106 are shown as being separate from the user device 102. However, in embodiments of the invention, the resource provider application 104 and the service provider application 106 can be on the user device 102 as shown in FIG. 1.

The method illustrated in FIG. 5A can be performed at any time after the user device 102 has enrolled with the authorizing entity computer 112, as described in reference to FIG. 4. The user of the user device 102 can initiate an interaction with a resource provider of a resource provider application 104.

At step 502, the user device 102 can select a resource (or otherwise indicate a particular resource) with the resource provider application 104 to include in the interaction. For example, the user can utilize the user device 102 to select a particular resource that is presented to the user via the resource provider application 104 installed on the user device 102. For example, the user can use the user device 102 to select one or more items to purchase and may place them in a virtual shopping card in the resource provider application 104.

At step 504, after receiving an indication of the resource for the interaction, the resource provider application 104 can generate a token query message. For example, the token query message can query a service provider application 106 for one or more tokens that are available to utilize in the current interaction.

At step 506, after generating the token query message, the resource provider application 104 can provide the token query message to the service provider application 106.

At step 508, after receiving the token query message from the resource provider application 104, the service provider application 106 can generate a user interface that requests that the user of the user device 102 to authenticate themselves. For example, the method to authenticate the user can include a password, a one-time-password, a user biometric, and/or any other information known to or held by the user.

At step 510, after generating the user interface, the service provider application 106 can provide the user interface to the user of the user device 102.

At step 512, the user interface can prompt the user of the user device 102 to authenticate themselves. The user may then authenticate themselves by inputting or otherwise providing authentication data such as a password to the user interface.

At step 514, after receiving the authentication data, the service provider application 106 can receive the authentication data in an authentication response message.

At step 516, after receiving the authentication response message comprising the authentication data, the service provider application 106 can verify the authenticity of the user. For example, the service provider application 106 can compare the received authentication data to stored authentication data. If the authentication data matches stored authentication data, then the service provider application 106 can determine that the user is authentic.

At step 518, after authenticating the user of the user device 102, the service provider application 106 can generate a cryptogram request message. The cryptogram request message can be a request for a cryptogram to be used with a first token (stored by the service provider application) for the current interaction. The token held by the service provider application 106 may have been provisioned to the service provider application 106 at any time prior to step 502. The cryptogram request message can include the token and an indicator that requests the return of any credentials linked to a first credential associated with the first token.

At step 520, after generating the cryptogram request message, the service provider application 106 can provide the cryptogram request message to the network processing computer 108.

At step 522, after receiving the cryptogram request message and based on the indicator from step 518, the network processing computer 108 can generate a detokenization request message comprising the token.

At step 524, after generating the detokenization request message, the network processing computer 108 can provide the detokenization request message to the token service computer 110.

At step 526, after receiving the detokenization request message, the token service computer 110 can determine the first credential associated with the received first token. For example, the token service computer 110 can store the first token in association with the first credential. The token service computer 110 can search a database for the first token and then obtain the first credential that is referenced by the first token.

At step 528, after determining the first credential, the token service computer 110 can determine a user identifier (e.g., a hashed value) associated with the first credential.

At step 530, after obtaining the user identifier, the token service computer 110 can search for each credential of one or more credentials that are stored in association with the user identifier. For example, the user identifier can be stored in association with three different credentials (e.g., the first credential, a second credential, and a third credential).

At step 532, after determining the other credentials that are associated with the account identifier, the token service computer 110 can sequentially determine whether or not each credential has been tokenized and provisioned to the service provider application 106. The token service computer 110 can reference a provisioning data table that can indicate whether or not the credential has been considered for tokenization for the service provider application 106.

Table 2, below, shows an exemplary a provisioning data table. The provisioning data table indicates whether or not a particular service provider, as identified by a service provider identifier, has considered (or the user of the user device has considered) provisioning a token for a given credential. Table 2 shows two different service provider identifiers ID1 and ID2 that identify two different service provider computers. The considered column can indicate whether or not the first credential of 1234567899998888 has been considered by that service provider computer. In this example, the first service provider computer with the service provider identifier of ID1 has not considered being for provisioning of a token for the credential of 1234567899998888. The second service provider computer with the service provider identifier of ID2 has considered for provisioning of a token for the credential of 1234567899998888.

TABLE 2

Example token provisioning consideration table

| Credential | Service Provider Identifier | Considered |
|---|---|---|
| 1234567899998888 | ID1 | N |
| 1234567899998888 | ID2 | Y |

At step 534, if the token service computer 110 obtains a second credential that has not yet been considered for tokenization for the service provider application 106, then the token service computer 110 can obtain the second credential from the database.

At step 536, after obtaining the second credential, the token service computer 110 can generate a detokenization response message comprising the second credential.

At step 538, after generating the detokenization response message, the token service computer 110 can provide the detokenization response message comprising second credential to the network processing computer 108.

At step 540, before or after obtaining the second credential from the token service computer 110, the network processing computer 108 can obtain a first cryptogram for the interaction. The first cryptogram can be used with the first token in an authorization request message to conduct an interaction such as a payment transaction.

At step 542, after obtaining the first cryptogram, the network processing computer 108 can generate a cryptogram response message. The cryptogram response message can include the first cryptogram that is to be used with the first token, and the second credential.

At step 544, after generating the cryptogram response message, the network processing computer 108 can provide the cryptogram response message comprising the first cryptogram and the second credential to the service provider application 106.

Referring to FIG. 5B, at step 546, after receiving the cryptogram response message, the service provider application 106 can generate a provision new token inquiry message. The provision new token inquiry message can be an inquiry to the (previously authenticated) user of the user device 102. The inquiry can be an inquiry of whether or not the user wants to provision a new token such as a second token associated with the second credential to the service provider application 106, where the second token corresponds to the received second credential. In some embodiments, the provision new token inquiry message can comprise the second credential. In some embodiments, the user of the user device 102 may be asked if they wish to continue to store the second credential on the service provider application 106, and the tokenization of the second credential may not be specifically known the user.

At step 548, after generating the provision new token inquiry message, the service provider application 106 can provide the provision new token inquiry message to the user device 102 via a new token inquiry user interface. In the interface, the second credential or part of the second credential (e.g., last four digits) can be shown to the user along with a question as to whether the user wants to tokenize and/or store the second credential in the service provider application.

At step 550, after receiving the provision new token inquiry message, the user device 102 can prompt the user of the user device 102 to select whether or not to provision a new token that corresponds to the second credential to and/or store the second credential in the service provider application 106. In some embodiments, the user device 102 can display the second credential (or a portion of the second credential) to the user, so that the user is aware that the new token request would be for the second credential. The user can then make a selection to have or not have the new token be provisioned and/or the second credential stored in the service provider application 106. The user can make the selection using any input elements of the user device 102 (e.g., a touch screen, a keyboard, a mouse, a stylus, etc.). In other embodiments, the user of the user device 102 need not be asked if they wish to have a token provisioned for the second credential. In such embodiments, the user device 102 may automatically initiate the token request for the second credential without seeking the user's input to do so.

At step 552, after receiving user input, the user device 102 can generate a provision new token response message comprising the user input (e.g., a selection of "yes" or "no").

At step 554, the provision new token response message can be provided to the service provider application 106.

At step 556, after receiving the provision new token response message, the service provider application 106 can determine whether or not to submit a request the network processing computer 108 to provision the new token. For example, the service provider application 106 can request the new token if the user input provided to the user device 102 indicates that the user wants a new token for the second credential. If the user input indicates that a new token is desired, the service provider application 106 can proceed to step 558. If the user input indicates that a new token is not to be provisioned for the second credential and/or the second credential is not be stored in the service provider application 106, the service provider application 106 can proceed to step 574.

At step 558, the service provider application 106 can generate a token request message. The token request message can comprise the second credential, and also other suitable information including a service provider application identifier, a user device identifier, the user identifier, a timestamp, etc.

At step 560, after generating the token request message, the service provider application 106 can provide the token request message to the network processing computer 108.

At step 562, after receiving the token request message, the network processing computer 108 can provide the token request message to the token service computer 110.

At step 564, after receiving the token request message, the token service computer 110 can obtain a second token for the second credential. In some embodiments, the token service computer 110 can generate the second token. In other embodiments, the token service computer 110 can obtain the second token from the database.

In some embodiments, the token service computer 110 can update the token provisioning consideration table to indicate that the service provider application 106 has considered the second credential for provisioning using the service provider application identifier.

At step 566, after obtaining the second token for the second credential, the token service computer 110 can generate a token response message comprising the second token.

At step 568, after generating the token response message, the token service computer 110 can provide the token response message to the network processing computer 108.

At step 570, after receiving the token response message, the network processing computer 108 can provide the token response message to the service provider application 106.

At step 572, after receiving the token response message, the service provider application 106 can store the second token. The second token can be stored for later use in a subsequent interaction such as a subsequent payment transaction.

At step 574, the service provider application 106 can assemble the information needed to complete the current interaction to the resource provider application. The assembled information may include the first token that was previously stored in the service provider application 106, and the first cryptogram that was obtained in step 544.

At step 576, after assembling the information, the assembled information can be provided by the service provider application 104 to the resource provider application 104.

At step 578, after receiving the information from the service provider application 104, the resource provider application 104 (or a corresponding application server computer) can generate an authorization request message that requests authorization for the current interaction. In some embodiments, the authorization request message can include the first token, the first cryptogram, and interaction data for the interaction. For example, the interaction data can include an amount (such as an amount of data, a monetary amount, an amount of time, etc.).

In other embodiments, instead of including the first token in the authorization request message, the authorization request message could comprise the second token, the interaction data, and a second cryptogram associated with the second token. In such embodiments, user of the user device 102 may have indicated to the service provider application 106 that the user wants to use the second token corresponding to the second credential to conduct the current interaction instead of the first token associated with the first credential. The second cryptogram can be generated for the second token can be generated by the network processing computer 108 after the network processing computer 108 receives the second token. The second cryptogram could be returned to the service provider application 106 by the network processing computer 108 along with the second token.

At step 580, after generating the authorization request message, the resource provider application 104 can provide the authorization request message to the network processing computer 108. In some embodiments, a transport computer such as an acquirer computer operated by an acquirer may receive the authorization request message from the service provider application and may transmit it to the network processing computer 108. The acquirer may be a bank that holds an account of the resource provider that operates the resource provider application.

At step 582, after receiving the authorization request message, the network processing computer 108 can generate a detokenization request message comprising the first token. The detokenization request message requests that the token service computer 110 return the first credential that is associated with the first token.

In some embodiments, the network processing computer 108 can validate the first cryptogram received in the authorization request message. For example, the network processing computer 108 can compare the received first cryptogram to the first cryptogram that was previously generated at step 540. If they match, then the received first cryptogram can be validated.

At step 584, after generating the detokenization request message, the network processing computer 108 can provide the detokenization request message to the token service computer 110.

At step 586, after receiving the detokenization request message, the token service computer 110 can obtain, from a database, the first credential that is stored in association with the first token.

At step 588, after obtaining the second credential, the token service computer 110 can generate a detokenization response message comprising the first credential.

At step 590, after generating the detokenization response message, the token service computer 110 can provide the detokenization response message to the network processing computer 108.

At step 592, after receiving the detokenization response message, the network processing computer 108 can modify the authorization response message to include the first credential. In some embodiments, the network processing computer 108 can replace the first token with the first credential in the authorization response message.

At step 594, after generating modifying the authorization response message, the network processing computer 108 can provide the authorization response message to the authorizing entity computer 112 for authorization of the interaction.

At step 596, after receiving the authorization response message, the authorizing entity computer 112 can determine whether or not to authorize the interaction. The authorizing entity computer 112 can determine whether or not to authorize the interaction based on any criteria related to, for example, the first credential, the first credential use history, the interaction data, the entities involved in the interaction, fraud rates, etc.

At step 598, after determining whether or not to authorize the interaction, the authorizing entity computer 112 can generate an authorization response message comprising an indication of whether or not the interaction is authorized.

The authorization response message can also include the first credential and the interaction data.

Referring to FIG. 5C, at step 600, after generating the authorization response message, the authorizing entity computer 112 can provide the authorization response message to the network processing computer 108.

At step 602, after receiving the authorization response message, the network processing computer 108 can generate a tokenization request message comprising the first credential. The tokenization request message can request the first token that is associated with the first credential.

At step 604, after generating the tokenization request message, the network processing computer 108 can provide the tokenization request message to the token service computer 110.

At step 606, after receiving the tokenization request message comprising the first credential, the token service computer 110 can obtain the first token from the database At step 608, after obtaining the first token, the token service computer 110 can generate a tokenization response message comprising the first token.

At step 610, after generating the tokenization response message, the token service computer 110 can provide the tokenization response message to the network processing computer 108.

At step 612, after receiving the tokenization response message comprising the first token, the network processing computer 108 can modify the authorization response message to include the first token. The network processing computer 108 can remove the first credential from the authorization response message.

At step 614, after modifying the authorization response message, the network processing computer 108 can provide the authorization response message to the resource provider application 104.

At step 616, after receiving the authorization response message, the resource provider application 104 can notify the user of the user device 102 of whether or not the interaction was authorized by the authorizing entity computer 112. For example, the resource provider application 104 can display an interaction complete or an interaction failed message on the user device 102.

At a later date or time, a clearing and settlement process may take place between a transport computer (not shown) operated by an acquirer associated with the resource provider operating the resource provider application 104, the network processing computer 108 and the authorizing entity computer 112.

It is noted that the steps described above need not take place in the exact order described and all steps are not necessary in embodiments of the invention. For example, the above described process includes the receipt of a second credential by a user device and the request for a second token before a transaction using a first token is completed. However, in other embodiments, it is possible to complete a transaction with a first token, and then a second token can be requested by the user device after the transaction using the first token is completed.

Figure 6:
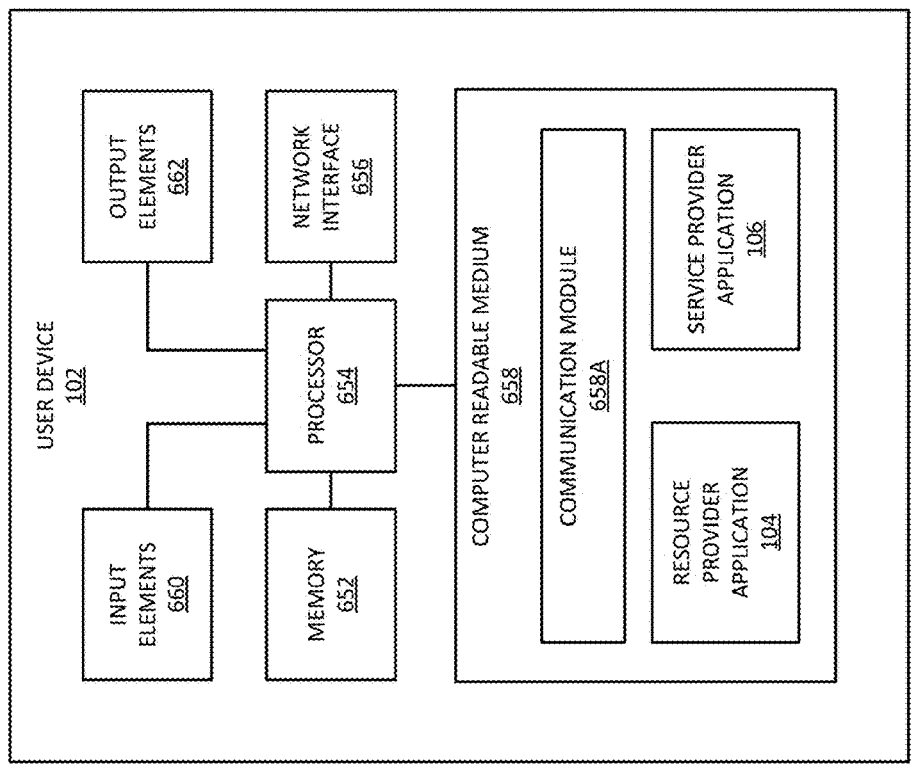
FIG. 6 shows a block diagram of components of a user device according to embodiments.

FIG. 6 shows a block diagram of a user device 102 according to embodiments. The exemplary user device 102 may comprise a processor 654. The processor 654 may be coupled to a memory 652, a network interface 656, input elements 660, output elements 662, and a computer readable medium 658. The computer readable medium 658 can comprise a communication module 658A. The computer readable medium 658 can further comprise a resource provider application 104 and a service provider application 106.

The memory 652 can be used to store data and code. For example, the memory 652 can store one or more tokens, one or more credentials, interaction data, etc. The memory 652 may be coupled to the processor 654 internally or externally (e.g., cloud based data storage), and may comprise any combination of volatile and/or non-volatile memory, such as RAM, DRAM, ROM, flash, or any other suitable memory device.

The input elements 660 may include any suitable device(s) capable of inputting data into the user device 102. Examples of input elements 660 include buttons, touchscreens, touch pads, microphones, etc.

The output elements 662 may include any suitable device(s) that may output data. Examples of output elements 662 may include display screens, speakers, and data transmission devices. For example, the output elements 662 can include a display screen capable of displaying a response value to a user of the user device 102.

The computer readable medium 658 may comprise code, executable by the processor 654, for performing a method comprising: generating, by a user device, a cryptogram request message comprising a token associated with a first credential during an interaction between a user of the user device and a resource provider of a resource provider application on the user device; providing, by the user device, the cryptogram request message to a network processing computer, wherein the network processing computer obtains a second credential from a token service computer, obtains a cryptogram for the interaction, and generates a cryptogram response message comprising the second credential and the cryptogram; and receiving, by the user device, the cryptogram response message comprising the second credential and the cryptogram from the network processing computer.

In some embodiments, the computer readable medium 658 may comprise code, executable by the processor 654, for performing the aforementioned method, wherein prior to generating the cryptogram request message, the method further comprises: generating, by a resource provider application on the user device, a token query message; providing, by the resource provider application on the user device, the token query message to a service provider application on the user device; generating, by the resource provider application on the user device, a user interface that requests that the user of the user device authenticate themselves; providing, by the user device, the user interface to the user, wherein the user provides authentication data; receiving, by the service provider application on the user device, the authentication data; and verifying, by the service provider application on the user device, the authentication data.

In some embodiments, the computer readable medium 658 may comprise code, executable by the processor 654, for performing the aforementioned method, wherein after receiving the cryptogram response message, the method further comprises: generating, by a service provider application of the user device, a provision new token inquiry message; providing, by the service provider application of the user device, the provision new token inquiry message to the user device via a new token inquiry user interface; prompting, by the user device, the user to select whether or not to provision a new token corresponding to the second credential; receiving, by the user device, user input that indicates whether or not to provision the new token; determining, by the service provider application on the user device, to whether or not to submit a request to the network processing computer to provision the new token; generating, by the service provider application on the user device, a token request message comprising the second credential;

providing, by the user device, the token request message to the network processing computer; and receiving, by the user device, a token response message comprising the new token from the network processing computer.

In some embodiments, the computer readable medium 658 may comprise code, executable by the processor 654, for performing the aforementioned method, wherein the provision new token inquiry message comprises the second credential.

The communication module 658A may comprise code or software, executable by the processor 204, for communicating with other devices. The communication module 658A may be configured or programmed to perform some or all of the functionality associated with receiving, sending, and generating electronic messages for transmission through the user device 102 to or from a network processing computer, an authorizing entity computer, etc. When an electronic message is received by the user device 102 via the network interface 656, it may be passed to the communication module 658A. The communication module 658A, in conjunction with the processor 654, may identify and parse the relevant data based on a particular messaging protocol used. The communication module 658A, in conjunction with the processor 654, may transmit any received information to an appropriate module within the user device 102. The communication module 658A, in conjunction with the processor 654, may receive information from one or more of the modules in the user device 102 and generate an electronic message in an appropriate data format in conformance with a transmission protocol so that the message may be sent to one or more entities within system 100 illustrated in FIG. 1 (e.g., the network processing computer 108, the authorizing entity computer 112, etc.). The electronic message may then be passed to the network interface 656 for transmission.

The network interface 656 can be similar to the network interface 206 of FIG. 2 and the network interface 306 of FIG. 3 and its description will not be repeated here. The resource provider application 104 can be similar to the resource provider application 104 of FIG. 1 and its description will not be repeated here. The service provider application 106 can be similar to the service provider application 106 and its description will not be repeated here.

Embodiments of the disclosure have a number of advantages. As shown above, the methods according to embodiments of the invention can efficiently and conveniently retrieve credentials and tokens for storage in a service provider application, without the requiring that the user specifically request the credentials or tokens. The retrieval of the credentials or tokens can be conducted as part of an interaction that the user is conducting with a different credential or token. For instance, a user may conduct a payment transaction with a first payment token associated with a first account number and stored in a service provider application. During the processing of a transaction using that first payment token, a second account number and a second token associated with the second account number can be automatically retrieved and stored in the service provider application. The user need not actively initiate the process of requesting that the second account number or the second token associated with the second account number be provisioned to the service provider application. If there are currently millions of credentials or tokens that could be provisioned to various service provider applications on various user devices, then embodiments of the invention would reduce the need to transmit many millions of messages to accomplish the provisioning.

Further, embodiments provide for a technical advantage of not requiring the user to manually input credentials to request tokens. This reduces erroneous requests and makes the process of provisioning account numbers and tokens to service provider applications more convenient for the user. This also solves at least the technical problem of how to limit the number of transmitted messages that might include sensitive data, such as payment credentials.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, by a token service computer, a detokenization request message comprising a first token from a network processing computer, after the network processing computer receives a cryptogram request message;
   determining, by the token service computer, a first credential that is stored in association with the first token in a database;

determining, by the token service computer, a user identifier that is stored in association with the first credential in the database;
determining, by the token service computer, that a second credential is stored in association with the user identifier;
generating, by the token service computer, a detokenization response message comprising the second credential; and
providing, by the token service computer, the detokenization response message comprising the second credential to the network processing computer, wherein the network processing computer generates a cryptogram response message comprising the second credential and a cryptogram, and provides the cryptogram response message in response to the cryptogram request message.

2. The method of claim 1, further comprising:
prior to receiving the detokenization request message, receiving, by the token service computer, the second credential and the user identifier from an authorizing entity computer;
storing, by the token service computer, the second credential in the database, the second credential being stored in association with the user identifier;
obtaining, by the token service computer, a second token; and
storing, by the token service computer, the second token in the database, the second token being stored in association with the second credential.

3. The method of claim 1, wherein the database further comprises a token provisioning consideration table associating a plurality of credentials, a plurality of service provider identifiers, and a plurality of indicators, wherein indicators are associated with whether a particular service provider application associated with a service provider identifier has considered provisioning a token for a particular credential.

4. The method of claim 3, wherein the second credential, as determined by the token service computer using the token provisioning consideration table, has not previously been considered for tokenization for a service provider application identifier of a service provider application associated with the detokenization request message.

5. The method of claim 3, further comprising:
receiving, by the token service computer, a token request message comprising the second credential from the network processing computer;
determining, by the token service computer, a second token that is stored in association with the second credential;
generating, by the token service computer, a token response message comprising the second token; and
providing, by the token service computer, the token response message to the network processing computer.

6. The method of claim 5, wherein the token request message further comprises a service provider application identifier associated with a service provider application that generated the token request message and provided the token request message to the network processing computer.

7. The method of claim 6, further comprising:
updating, by the token service computer, the token provisioning consideration table using the service provider application identifier to indicate that the service provider application has considered the second credential for tokenization.

8. The method of claim 1, further comprising:
receiving, by the token service computer, a token request message comprising the second credential from the network processing computer;
determining, by the token service computer, a second token that is stored in association with the second credential;
generating, by the token service computer, a token response message comprising the second token; and
providing, by the token service computer, the token response message to the network processing computer.

9. The method of claim 1, wherein the detokenization request message is received from the network processing computer during an interaction between a user of a user device and a resource provider of a resource provider computer.

10. The method of claim 9, wherein the first credential and the second credential are associated with the user.

11. The method of claim 9, wherein the interaction is an access interaction, a payment transaction, or a data transfer interaction.

12. The method of claim 1, wherein the user identifier is a hashed value, the first credential is a first account number, and the second credential is a second account number.

13. A system comprising:
a server computer comprising
a processor, and
a computer-readable medium coupled to the processor, the computer-readable medium comprising instructions executable by the processor to cause the processor to perform a method comprising
receiving a detokenization request message comprising a first token from a network processing computer, after the network processing computer receives a cryptogram request message,
determining a first credential that is stored in association with the first token in a database,
determining a user identifier that is stored in association with the first credential in the database,
determining that a second credential is stored in association with the user identifier,
generating a detokenization response message comprising the second credential, and
providing the detokenization response message comprising the second credential to the network processing computer, wherein the network processing computer generates a cryptogram response message comprising the second credential and a cryptogram, and provides the cryptogram response message in response to the cryptogram request message.

14. The system of claim 13, the method further comprising:
prior to receiving the detokenization request message, receiving the second credential and the user identifier from an authorizing entity computer;
storing the second credential in the database, the second credential being stored in association with the user identifier;
obtaining a second token; and
storing the second token in the database, the second token being stored in association with the second credential.

15. The system of claim 13, wherein the server computer is a token service computer.

16. The system of claim 13, wherein the server computer comprises the database, and wherein the database comprises associations of tokens, credentials, and user identifiers; and a token provisioning consideration table comprising associations of a plurality of credentials, a plurality of service provider identifiers, and a plurality of indicators, wherein indicators are associated with whether a particular service provider application associated with a service provider application identifier has considered provisioning a token for a particular credential.

17. The system of claim 16, the method further comprising:
  receiving a token request message comprising the second credential from the network processing computer;
  determining a second token that is stored in association with the second credential;
  generating a token response message comprising the second token; and
  providing the token response message to the network processing computer.

18. The system of claim 17, wherein the second credential, as determined by the server computer using the token provisioning consideration table, has not previously been considered for tokenization for a service provider application identifier of a service provider application associated with the detokenization request message.

19. The system of claim 17, wherein the token request message further comprises a service provider application identifier associated with a service provider that generated the token request message and provided the token request message to the network processing computer.

20. The system of claim 13, wherein the detokenization request message is received from the network processing computer during an interaction between a user of a user device and a resource provider of a resource provider computer.

* * * * *